ed Nov. 3, 1953

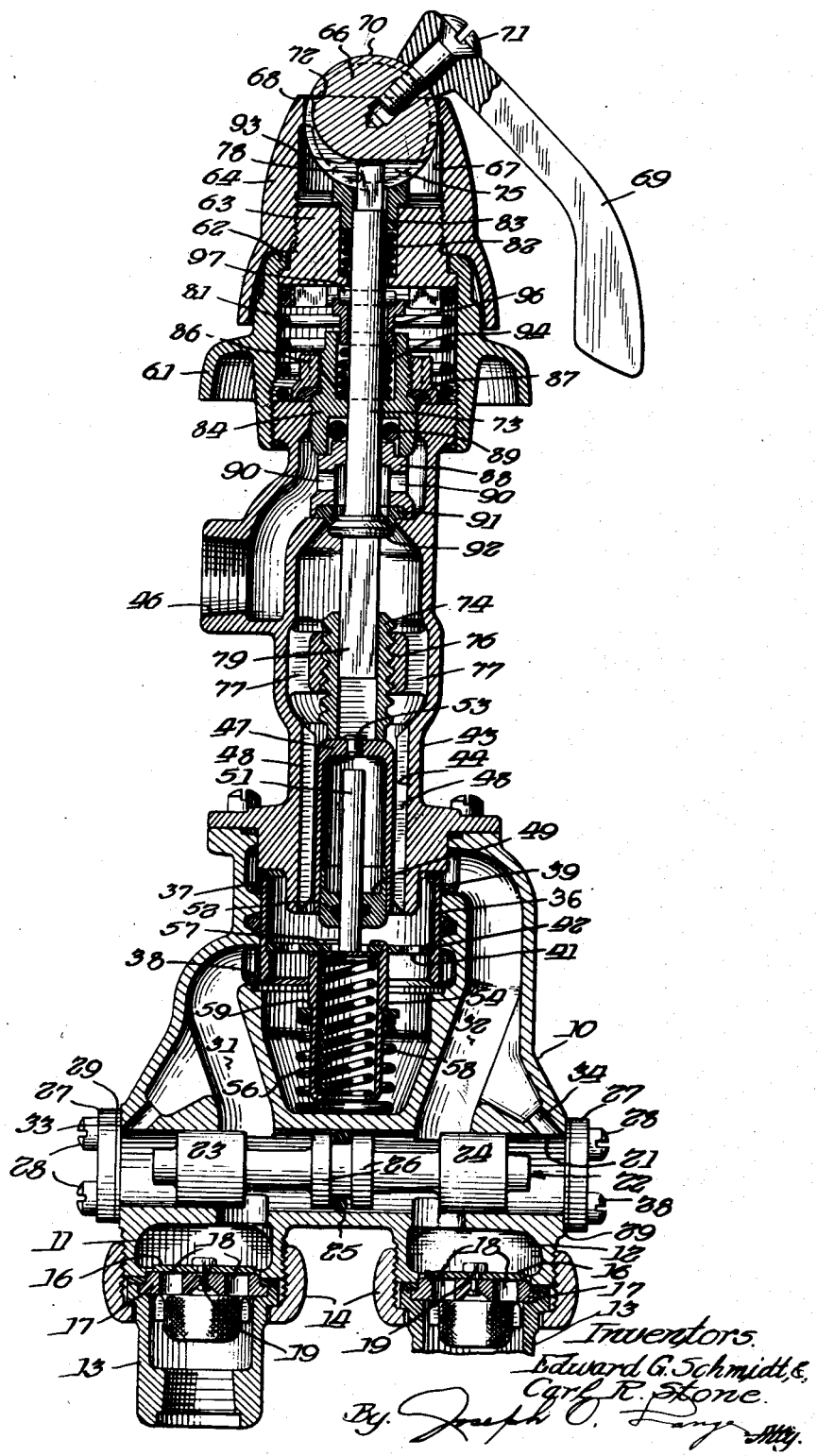

2,657,860

UNITED STATES PATENT OFFICE 2,657,860

SINGLE HANDLE THERMOSTATIC MIXING VALVE

Edward G. Schmidt, La Grange, and Carl R. Stone, Lombard, Ill., assignors to Crane Co., Chicago, Ill., a corporation of Illinois Application January 16, 1951, Serial No. 206,201

6 Claims. (Cl. 236—12)

This invention pertains to a valve, and, more especially, it pertains to a novel single handle thermostatic mixing valve.

At the outset, it should be understood that a single handle thermostatic mixing valve is particularly useful in the application of valves for plumbing lavatories, kitchen sinks, bathroom showers, or the like, which require accurately controlled mixed water temperatures. Presently known mixing valves do accomplish the desirable result of water temperature control in the above mentioned applications.

The existence of the latter above referred to prior art is apparent in patents, such as U. S. Patent No. 2,172,489, issued September 12, 1939. It is apparent however that the construction shown therein is not capable of water temperature and pressure control in combination with rate of flow control. The present patent application discloses patentable distinctions over the above mentioned constructions.

Thus, it is an important object of this invention to provide a single handle mixing valve capable of controlling the mixed liquid temperature and the rate of flow.

Another important object of this invention is to provide a single handle mixing valve capable of controlling the mixed liquid temperature, the rate of flow, and the liquid pressure at the hot and cold liquid inlets.

Other objects and advantages will become more readily apparent upon proceeding with the following description read in light of the accompanying assembly drawing which is an elevational section view through a preferred embodiment of this invention.

As shown in the drawing, the valve preferably comprises a multi-port body 10 having dual inlet openings 11 and 12 suitable for respective connection to the usual hot and cold water supply pipes which are not shown. To facilitate the connection with the said supply pipes, a tailpiece member 13 is preferably aligned with each of the water inlets 11 and 12 to form a continuous flow passage therewith while being joined to the body 10 by means of a pair of union rings 14. An annular union gasket is preferably provided between the aligned end surfaces of the body inlets and the tailpieces 13 to insure liquid tightness therebetween.

It is preferred that a check valve be located in each of the inlets 11 and 12 to prevent crossconnection or backflow intermixing of the hot and cold water in the said supply pipes. These check valves are shown to comprise a flexible diaphragm 16 disposed in the flow passage of each of the inlets 11 and 12, and are mounted by means of a screw or rivet 19 on the downstream side of a check valve seat 17 which in turn is positioned in the joints between the body 10 and the tailpieces 13. The seats 17 are provided with a plurality of flow apertures 18 which permit flow into the body 10, with flexing of the diaphragm 16, while the diaphragms prevent backflow from the body 10.

Within the body 10, there is preferably, but not necessarily, located a liquid pressure equalizer comprising a cylinder 21 which extends between the hot and cold inlets 11 and 12 to receive a piston member 22 having a pair of end closure members 23 and 24 suitable for operation in the hot and cold inlet passages respectively, thereby to regulate liquid flow therethrough. A central portion 26 of the piston 22 is formed with a groove to receive an O-ring 25 which snugly contacts the cylinder 21 to be liquid tight therewith. Thus, any pressure differential between the hot and cold water inlets 11 and 12 will act on the outer end portions 23 and 24 of the piston 22 to shift the piston and thereby regulate the inlet openings with the piston closures 23 and 24 and equalize the liquid pressures therebetween.

Experiments have shown that the equalizer above described is sufficiently effective to actually close off the entire water supply where the supply to either inlet is shut off. This provides a rapid pressure regulator for unusual operating conditions where either the hot or cold water supply pressure is diminished.

Cylinder end plates 27 are preferably provided to enclose the cylinder 21 and are secured thereto by means of the screws 28 with the gaskets 29 being located between the ends of the cylinder and the end plates 27.

Flow inlet passages 31 and 32 formed within body 10 provide the continuation of the hot and cold inlets 11 and 12, respectively, beyond the pressure equalizer described above. To insure effective operation of the piston 22, the fluid passageways 33 and 34 communicate with inlets 31 and 32, respectively, and extend behind piston closures 23 and 24 to balance the fluid pressure therearound.

The hot and cold inlets 31 and 32 are shown to lead into an upper central chamber 36 of the body 10 wherein a hollow cylindrically shaped proportioning piston 37 is snugly disposed to operate in a manner hereinafter described to control the quantity of each fluid passing through the valve. It should be noted that the hot water inlet 31 leads into a portion of chamber 36 at one end of piston 37, while the cold water inlet 32 leads to chamber 36 at the opposite end of piston 37. Thus, since the piston 37 operates with axial displacement between two oppositely disposed seats 38 and 39 which respectively relate to the hot and cold water inlets 31 and 32, the hot and cold water flow is proportioned by the vertical position of piston 37.

In the proportioning valve position shown, hot water only will flow through the valve, since piston 37 normally is seated on seat 39, thereby closing off the cold water flow. Hot water will then flow into the cylindrical piston 37 and through the apertures 41 in a bearing plate 42 which, as shown, is shouldered and welded within the piston to receive the force of actuation applied thereto as later herein described.

A valve bonnet 43 is shown suitably bolted to the body 10 to position a central opening or chamber 44 in communication with the interior of the cylindrical piston 37. Thus, liquid flow into the piston 37 continues into the bonnet 43 and is discharged through the bonnet outlet 46 to the destination desired.

A thermostat 47 is located within the bonnet chamber 44, being guided therein by bonnet ribs 48. Since the thermostat 47 is in the mixed liquid chamber, it is available to control the temperature of the mixed water by means of responding to the mixed water temperature to axially position piston 37 while permitting the water to flow therepast. The said thermostat is composed of a lower collar 49 which is liquid tightly joined with a stem 51 extending through the collar. An O-ring 52 is preferably provided around the stem 51 to completely seal the thermostat while permitting axial movement of the stem. A temperature responsive fluid is preferably disposed within the thermostat, the interior of which is sealed by a plug 53.

Before describing the thermostatic operation, it should be noted that the piston bearing plate 42 has a spring housing 54 connected thereto on the side opposite from the thermostat. An overrun coil spring 56 is disposed within the housing 54 to abut an end plate 57 which is freely disposed within the housing to be in continuous contact with the spring 56 on one side and the stem 51 on the opposite side.

With this arrangement as described and shown, fluid within the thermostat is affected by the temperature of the surrounding water, such that, for example, if the thermostat is heated, the inside fluid will expand to thereby force stem 51 to move axially outwardly. Stem 51 then exerts a force downwardly on plate 57 to displace the housing 54 by acting on spring 56 without compressing it, and thus positions the piston 37 by virtue of the previously described connections. A second temperature control arrangement is also provided in this construction as is described in a following section.

A second coil spring 58 is shown positioned outside the housing 54 to abut a lower portion of the body chamber 36 and a housing shoulder 59. It should thus be apparent that the spring 58 acts upwardly on the housing 54 to urge the piston 37 upwardly or toward the cold water seat 39. Spring 56 is normally stronger than spring 58 to insure displacement of housing 54 when the said force of the stem 51 is applied to the spring 56.

In the above described spring housing arrangement, the following described overrun safety feature is provided to avoid damage of the thermostat. If the water temperature is excessively hot, the thermostat fluid can continue to expand to force stem 51 axially downwardly, but the only result will be the compressing of spring 56, after the piston 37 is positioned on seat 38.

Threadedly mounted on an upper portion of the bonnet 43 is a cylindrical flange member 61 which is provided to be preferably positioned against a wall or fixture (not shown) in installing the mixing valve. An upper inwardly turned portion 62 of the flange 61 abuts a shoulder of a plug 63 to secure the latter against upward movement from the flange 61 while permitting rotative motion of the plug in the flange. The plug 63 is externally threaded to engage an escutcheon 64 which has a lower portion suitable to rest on an adjacent portion of the flange 61. Thus, the flange, plug, and escutcheon are axially joined while the latter two members are free to rotate jointly on and with respect to the flange.

A ball cam 66 whose main external surface is shown in dotted lines is preferably disposed within an upper central opening 67 in the escutcheon 64 to be maintained in the opening 67 by an upper inwardly turned lug portion 68 of the escutcheon 64. An external band 70 exists on the ball cam, as shown beyond the dotted line, to be received within a groove 72 on the escutcheon lug 68. Thus, rotation of the ball 66 about its vertical axis will effect similar rotation of the escutcheon 64. An operating handle 69 is connected to the ball cam 66 by means of a screw 71. A flat sided groove 75 is provided in the ball cam 66 to receive and key with a square or flat cross section end 78 of a valve stem 73 which extends into the valve bonnet 43 where an opposite square or polygonal cross section end 79 of the stem 73 is received by a threadpiece 74. The latter member is mounted within the bonnet 43 in a threaded sleeve 76 which is suspended therewithin by brackets 77 arranged to allow liquid to flow therepast. The lower end of the threadpiece 74 normally abuts the upper surface of the thermostat 47.

With the above described stem and ball cam arrangement, actuation of the handle 69 rotates the ball cam 66 and escutcheon 64 about their vertical axes, and also rotates stem 73 which in turn axially displaces the threadpiece 74. Since the latter member abuts the thermostat 47, it should be apparent that adjustment of the thermostat, by totally displacing the same, is possible through the above described actuation of the operating handle 69. Water temperature indication marks, e. g., "Cold," "Warm," "Hot," are preferably spaced on the escutcheon lower portion to coincide with an index mark on the flange 61, thereby indicating to the operator what water temperature will be at the outlet.

Referring again to the upper portion of the valve, a friction spring 81 is positioned between the plug 63 and the upper surface of the bonnet 43 thereby to maintain a desired set rotative position of the escutcheon 64 and plug 63 in relation to the flange 61 by urging the plug against the flange turned edge 62. A central recessed portion of the plug 63 contains a friction spring 82 and a stem guide 83, both of which members surround the stem 73 to urge the guide 83 upwardly against the ball cam 66. Thus, the ball cam 66 is held in position with the escutcheon 64 while foreign matter is prevented from entering the valve.

Threadedly engaged with an inner upper portion of the bonnet 43 is the centerpiece 84 which surrounds an adjacent portion of the stem 73 and engages a locknut 86 to secure the aforementioned connection and to provide a chamber for receiving a packing ring 87. Thus, the upper portion of the valve is conveniently made liquid tight.

A lower inner recessed portion of centerpiece 84 abuts a lower sleeve member 88 to form a chamber of predeterminately fixed dimensions around the stem 73 and thereby provide space for receiving a packing material, such as the O-ring 89, which is not subjected to excessive mechanical loads but which does provide for liquid sealing around stem 73. Sleeve 88 contains a plurality of flow apertures 90 to communicate the center of the sleeve with the valve outlet 46.

The sleeve 88 extends downwardly to rest on an annular partition within the bonnet 43 while an annular space between the sleeve and bonnet receives a valve seat ring 91. A valve closure member 92 is mounted on the stem 73 to provide for selectively interrupting liquid flow through the valve. It should be noted that the stem 73 and the closure 92 are held in their upward position by means of a spring 94 disposed in centerpiece 84 to act on a stem collar 96 which in turn acts on a stem pin 97 and thereby holds the stem in place.

Referring again to the operation of the valve, an under surface 93 of ball cam 66 is arcuately formed to act as an actuating surface bearing against the upper end limit of the stem 73. Since the ball cam 66 is mounted to rotate relative to the escutcheon 64 about the horizontal axis of the ball cam, the handle 69 can be raised to engage ball cam surface 93 with the stem 73, thereby selectively depressing the latter to axially displace the same and unseat the closure member 92 to allow mixed liquid to flow through the valve. At any point of operation of the handle 69, to control the rate of flow as described above, the handle 69 can also be rotated to effect the previously described temperature control by actual adjustment of the vertical position of the thermostat 47.

Thus, it should be apparent that a compact and efficient mixing valve has been provided whereby single handle operation controls liquid flow and mixed water temperature in an accurate manner as proven by actual tests of the completed construction.

It should also be clear that although this invention has been described in a specific form, it should not be so limited, as it is susceptible to numerous changes within the spirit of this invention and the scope of the appended claims.

We claim:

1. A mixing valve of the character described having a single means of actuation for controlling the mixed liquid temperature and the rate of flow therethrough, the combination comprising a valve body having hot and cold liquid inlets and a common mixing chamber, a bonnet mounted on the said valve body and having a liquid outlet in communication with the said mixing chamber, a valve seat within the mixing chamber, a proportioning valve comprising a hollow cylindrical member mounted for reciprocating movement between the said inlets and said mixing chamber to control the flow of hot and cold liquids into said mixing chamber, the said proportioning valve having an apertured transverse wall portion therewithin, an axially movable thermostat mounted in said mixing chamber operatively connected to the said transverse wall portion of the proportioning valve, a rotatable threadpiece carried by the said bonnet and mounted to abut said thermostat, a rotatable and axially movable stem operatively connected with the said threadpiece to permit axial movement relative to the latter member, a valve closure portion on the said stem arranged to cooperate with said valve seat and thereby selectively interrupt liquid flow through said valve, the said threadpiece being non-rotatably mounted relative to an end portion of the said stem, the said valve closure portion and said threadpiece being independently movable upon predetermined actuation of the said stem in a plurality of directions.

2. A mixing valve of the character described having a single means of actuation for controlling the mixed liquid temperature and the rate of flow therethrough, the combination comprising a valve body having hot and cold liquid inlets with spaced-apart annular seats adjacent thereto and a common mixing chamber, a bonnet mounted on the said valve body having a transverse apertured portion and having a liquid outlet in communication through said apertured portion with the said mixing chamber, a valve seat within the mixing chamber, a proportioning valve comprising a hollow piston-like member mounted to move between the spaced-apart annular seats adjacent the said inlets and said mixing chamber to control the flow of hot and cold liquids into said mixing chamber, an axially movable thermostat mounted in said mixing chamber operatively connected to the said proportioning valve, resilient means therebetween to allow for axial movement of the thermostat relative to the said proportioning valve, a rotatable threadpiece mounted to abut said thermostat, a rotatable and axially movable threaded stem operatively connected with the said threadpiece, a valve closure on the said stem to cooperate with said valve seat and movable axially therewith to selectively interrupt liquid flow through said bonnet and valve, the said threadpiece being supported in the transverse apertured portion of the bonnet and being non-rotatably movable therewithin relative to an end engaging portion of the said stem, the said valve closure and said threadpiece being independently operable selectively upon actuation of the said stem axially and rotatably.

3. A mixing valve of the character described having a single means of actuation for controlling the mixed liquid temperature and the rate of flow therethrough, the combination comprising a valve body having hot and cold liquid inlets and a common mixing chamber with annular spaced-apart seats therebetween, a bonnet mounted on the said valve body defining the upper limit of one of the annular seats and having a liquid outlet in communication with the said mixing chamber, a valve seat within the mixing chamber, a hollow cylindrical proportioning valve mounted for reciprocating movement relative to the said seats to regulate the flow of hot and cold liquids therepast into said mixing chamber, a hollow thermostat mounted in said mixing chamber having an axially movable shaft resiliently connected to the said proportioning valve, a threadpiece journaled to abut an end portion of said thermostat upon predetermined movement of said threadpiece, an axially movable stem threadedly connected with the said threadpiece to regulate movement of the said shaft, a valve closure member on the said stem to cooperate with said valve seat and thereby to selectively interrupt liquid flow through said valve, the said threadpiece being slidably mounted relative to a lower end portion of the said stem, the said valve closure member and the threadpiece being independently operated with predetermined actuation of the said stem.

4. A mixing valve of the character described having a single means of actuation for controlling the mixed liquid temperature and the rate of flow therethrough, the combination comprising a valve body having hot and cold liquid inlets and a common mixing chamber, a bonnet mounted on the said valve body and having a liquid outlet in communication with the said mixing chamber, a valve seat within the mixing chamber, a proportioning rimmed valve mounted to seat selectively between the said inlets and said mixing chamber to control the flow of hot and cold liquids into the said mixing chamber, a hollow axially movable thermostat guided in spaced-apart relation to the said mixing chamber and connected to a transverse portion of the said proportioning valve, a threadpiece mounted for axial movement in said body to predeterminately abut said thermostat, an axially movable stem telescopically mounted relative to the said threadpiece, a valve closure member on the said stem to cooperate with said valve seat and selectively interrupt liquid flow through said valve, the said threadpiece being mounted to receive non-rotatably an end portion of the said stem, the said valve closure member and said threadpiece being selectively operable upon actuation of the said stem in a plurality of directions, the said thermostat being supported within the said body and held therewithin against the said threadpiece.

5. A mixing valve of the character described having a single means of actuation for controlling the mixed liquid temperature and the rate of flow therethrough, the combination comprising a valve body having upper and lower annular seats and with hot and cold liquid inlets and a common mixing chamber, a bonnet mounted on the said valve body and having a liquid outlet in communication with the said mixing chamber, a valve seat within the mixing chamber, a proportioning hollow valve with end disposed annular seating portions between the said inlets and said mixing chamber to selectively engage said body annular seats to control the flow of hot and cold liquids into said mixing chamber, an axially movable hollow thermostat mounted in said mixing chamber with a shaft portion operatively connected for axial movement relative to the said proportioning valve, a rotatable threadpiece mounted in said body to abut said thermostat, an axially movable stem non-rotatably mounted relative to the said threadpiece, closure means on the said stem cooperating with said valve seat to selectively interrupt liquid flow through said valve, the said threadpiece receiving telescopically an end portion of the said stem, the said closure means being reciprocally movable and the said threadpiece being rotatable upon predetermined actuation of the said stem, the said proportioning valve having resilient means arranged in substantially telescoped relation and cooperating with the said thermostat to permit an overrun of the said latter member.

6. A mixing valve of the character described having a single means of actuation for controlling the mixed liquid temperature and the rate of flow therethrough, the combination comprising a valve body having hot and cold liquid inlets and a common mixing chamber, a bonnet mounted on the said valve body and having a liquid outlet in communication with the said mixing chamber, a valve seat within the mixing chamber, a tubular proportioning valve with end annular rims arranged for seating between the said inlets and said mixing chamber to control the flow of hot and cold liquids into said mixing chamber, the said proportioning valve having a ported partition between the annular rims, an axially movable thermostat mounted in said mixing chamber and axially movable relative to the said proportioning valve, a rotatable threadpiece mounted in a ported partition in said body to cooperate with the said thermostat, a rotatable and axially movable stem operatively communicating with the said threadpiece, a valve closure portion on the said stem to contact said valve seat and selectively interrupt liquid flow through said valve upon predetermined axial movement of said stem, the said threadpiece being telescopically mounted relative to an end polygonal portion of the said stem, the said valve closure portion and said threadpiece being independently operated upon suitable actuation of the said stem, the said thermostat being mounted within said body to bear against said threadpiece and having a reciprocally movable shaft portion engaging the ported partition of the said proportioning valve.

EDWARD G. SCHMIDT.
CARL R. STONE.

References Cited in the file of this patent
UNITED STATES PATENTS

| Number | Name | Date |
|---|---|---|
| 1,693,758 | Hennessey | Dec. 4, 1928 |
| 1,945,646 | Kumpman et al. | Feb. 6, 1934 |
| 2,102,011 | Kysor | Dec. 14, 1937 |
| 2,110,952 | Glenn | Mar. 15, 1938 |
| 2,250,815 | Ruegg et al. | July 23, 1941 |
| 2,257,442 | Yula | Sept. 30, 1941 |
| 2,267,976 | Hermann | Dec. 30, 1941 |
| 2,548,516 | Cantalupo | Apr. 10, 1951 |